(12) United States Patent
Lan

(10) Patent No.: US 6,322,097 B1
(45) Date of Patent: Nov. 27, 2001

(54) STROLLER

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 0 days.

(21) Appl. No.: 09/593,989

(22) Filed: Jun. 14, 2000

(51) Int. Cl.[7] .................................................. B62B 1/00
(52) U.S. Cl. ..................... 280/642; 280/47.4; 280/47.41; 297/370
(58) Field of Search ............................... 280/47.41, 47.4, 280/47.38, 42, 642, 650; 297/370, 371, 367

(56) References Cited

U.S. PATENT DOCUMENTS

| | | | |
|---|---|---|---|
| 4,915,401 | * | 4/1990 | Severson et al. ........................ 280/30 |
| 4,986,564 | * | 1/1991 | Liu ........................................ 280/642 |
| 5,806,877 | * | 9/1998 | Huang ................................... 280/642 |
| 5,988,670 | * | 11/1999 | Song et al. ........................... 280/648 |
| 6,086,086 | * | 7/2000 | Hanson et al. ....................... 280/650 |

* cited by examiner

*Primary Examiner*—Lanna Mai
*Assistant Examiner*—Christopher Buchanan

(57) ABSTRACT

A stroller includes a stroller frame, a backrest, left and right positioning members movable between a locking position and an unlocking position, and a releasing unit including a pulling member, left and right pushing members mounted movably on the backrest for moving the left and right positioning members to the unlocking position, and left and right urging members that urge respectively the left and right pushing members to move away from the left and right positioning members. The pulling member includes a rod member mounted movably on the backrest, a connecting block connected to the rod member and having a through-hole, and a single flexible string passing through the through-hole and extending sidewisely from the through-hole to be connected to the left and right pushing members.

5 Claims, 5 Drawing Sheets

STROLLER

BACKGROUND OF THE INVENTION

1. Field of the Invention

This invention relates to a stroller, more particularly to a stroller with an adjustable backrest.

2. Description of the Related Art

A stroller normally includes a stroller frame with front and rear legs and a seat frame, an adjustable backrest mounted pivotally on the stroller frame for turning relative to the stroller frame toward and away from the seat frame, a positioning unit including a pair of swingable pieces that engage releasably the backrest for positioning selectively the backrest at one of inclined positions relative to the seat frame, and a releasing unit including a pulling member and a pair of pushing members that are connected to the pulling member and that engage releasably the swingable pieces when pulled by the pulling member for disengaging the swingable pieces from the backrest so as to permit the backrest to turn to a desired inclined position relative to the seat frame. Conventionally, the pulling member is constructed by using either a set of metal rods, which are joined together, or a string unit in order to perform the disengagement of the swingable pieces from the backrest. However, such pulling member is disadvantageous in that when metal rods are used, the total weight of the stroller will be increased considerably so that the stroller is inconvenient to carry, and when a string unit is used, the structure of the pulling member will be relatively complex so that adjustment of the backrest to a desired inclined position is not easy.

SUMMARY OF THE INVENTION

Therefore, the object of the present invention is to provide a stroller with a pulling member that is capable of overcoming the aforementioned problems.

According to the present invention, a stroller comprises: a stroller frame having front and rear legs and a seat frame secured to the front and rear legs; a backrest having left and right supporters mounted pivotally and respectively on two opposite sides of the seat frame adjacent to the rear legs for turning upwardly and rearwardly relative to the stroller frame away from the seat frame, and downwardly and forwardly relative to the stroller frame toward the seat frame; left and right positioning members respectively having left and right swingable pieces, and left and right locking protrusions, the left and right swingable pieces being mounted pivotally and respectively on two opposite sides of the stroller frame adjacent to the left and right supporters of the backrest, respectively, and having respectively left and right bottom edges formed with a plurality of spaced apart and aligned locking grooves which open downwardly, the left and right locking protrusions projecting respectively from the left and right supporters to engage selectively and releasably one of the locking grooves in the left and right bottom edges for positioning the backrest, the left and right swingable pieces being rotatable relative to the stroller frame so as to move upwardly and rearwardly to an unlocking position for disengaging the locking grooves in the left and right bottom edges from the left and right locking protrusions, and to move downwardly and forwardly to a locking position for engaging the locking grooves in the left and right bottom edges and the left and right locking protrusions; and a releasing unit including a pulling member mounted movably on the backrest between the left and right supporters for moving upwardly and downwardly relative to the backrest, left and right pushing members mounted movably and respectively on the left and right supporters for moving the left and right swingable pieces of the left and right positioning members to the unlocking position, and left and right urging members that urge respectively the left and right pushing members to move away from the left and right swingable pieces, the pulling member including a vertically extending rigid rod member mounted movably on the backrest between the left and right supporters, a connecting block that is connected to a lower end of the rod member and that has a through-hole, and a flexible single string passing through the through-hole in the connecting block and extending sidewisely from the through-hole to be connected to the left and right pushing members.

BRIEF DESCRIPTION OF THE DRAWINGS

In drawings which illustrate an embodiment of the invention.

DETAILED DESCRIPTION OF THE PREFERRED EMBODIMENTS

Figure 1:
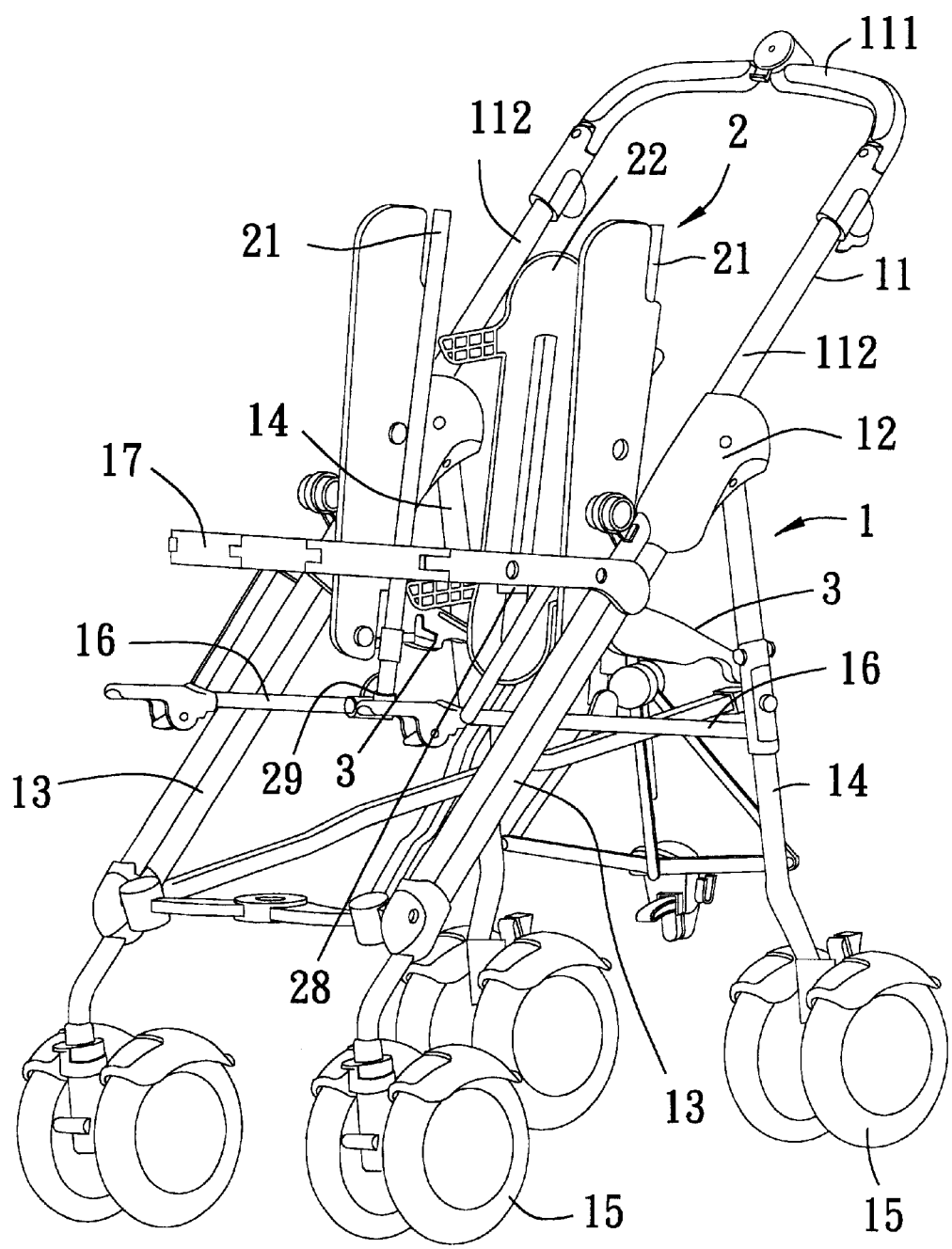
FIG. 1 is a front perspective view of a stroller embodying this invention.
Figure 2:
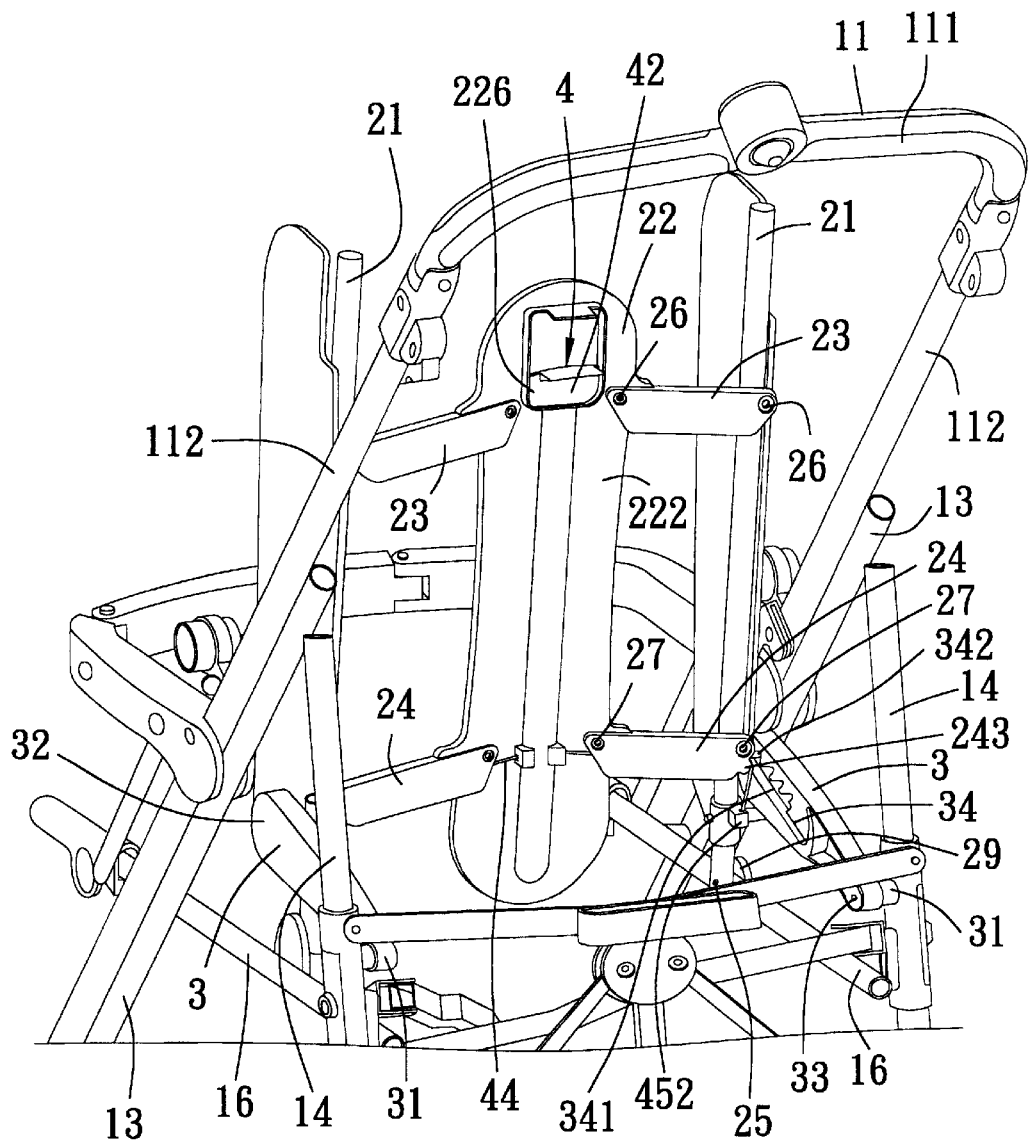
FIG. 2 is a fragmentary rear perspective view of the stroller of FIG. 1.
Figure 3:
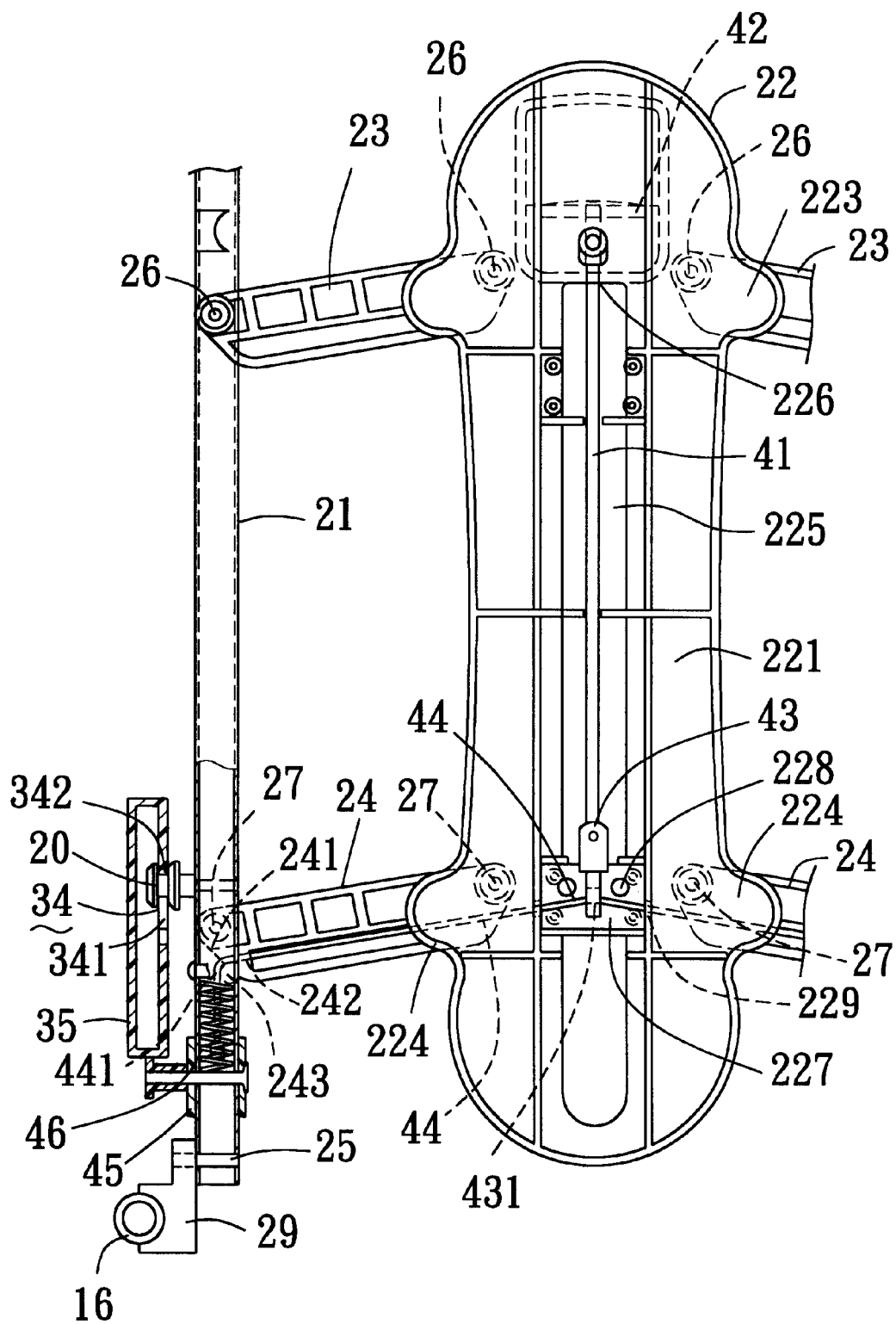
FIG. 3 is a fragmentary front view of a backrest of the stroller of FIG. 1 in a locking position.
Figure 4:
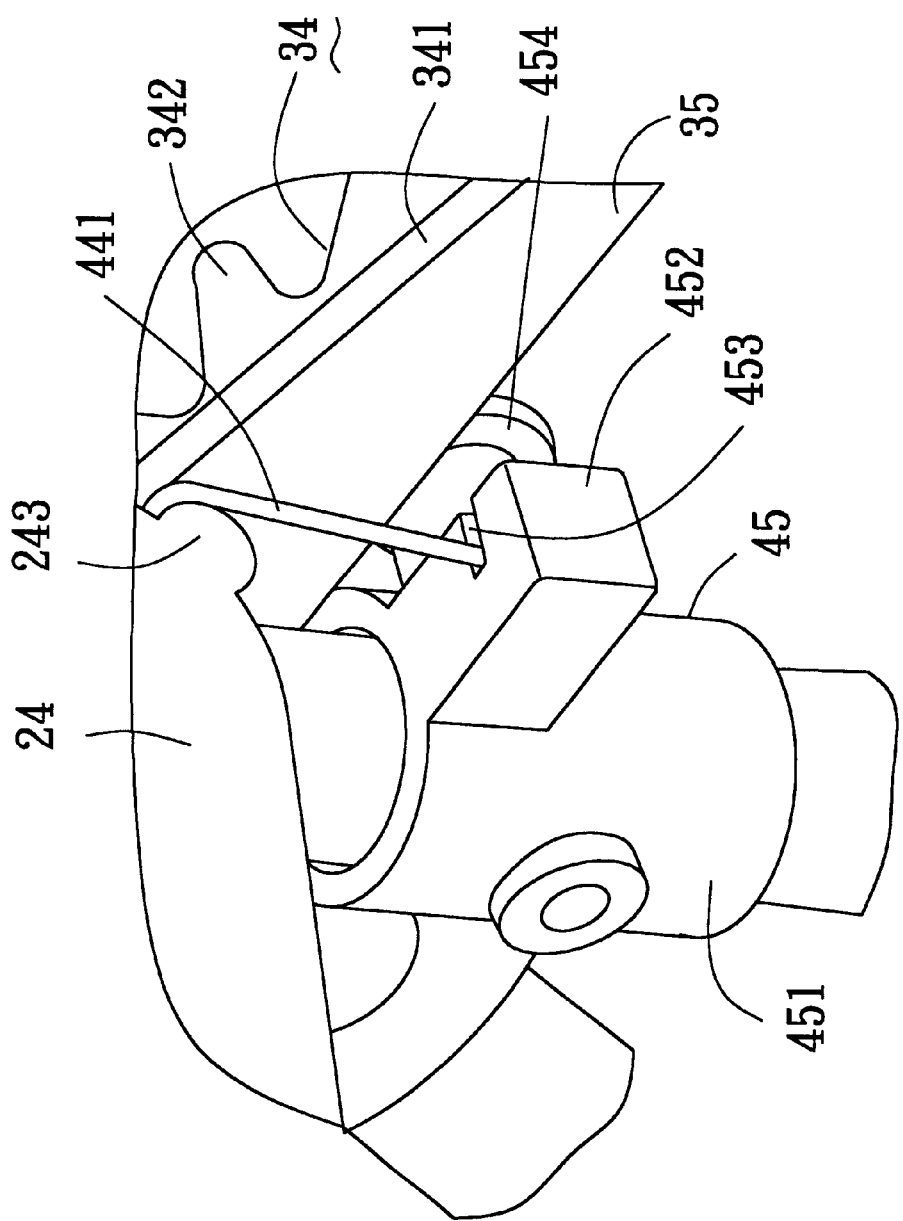
FIG. 4 is a fragmentary perspective view of a pushing member of the stroller of FIG. 1.

FIGS. 1 to 4 illustrate a stroller embodying this invention. The stroller includes a stroller frame 1, a backrest 2 mounted pivotally on the stroller frame 1, left and right positioning members 3, and a releasing unit 4.

The stroller frame 1 includes a handle unit 11 that has a grip portion 111 and two parallel inclined handle rods 112 connected to the grip portion 111, a pair of pivot units 12 connected respectively to the handle rods 112, a pair of front legs 13 connected respectively to the handle rods 112 via the pivot units 12 and provided with wheels 15, a pair of rear legs 14 connected respectively to the pivot units 12 and provided with wheels 15, a front guard piece 17 mounted on the front legs 13, and a seat frame that has a pair of seat rods 16 disposed between the front and rear legs 13, 14 and connected to the rear legs 14 and the front guard piece 17. A pair of linking blocks 29 are respectively secured to the seat rods 16 adjacent to the rear legs 14.

The backrest 2 includes left and right supporters 21 mounted pivotally and respectively on the linking blocks 29 via a pair of pivot pins 25, a vertically extending central plate 22 having top and bottom ends, laterally extending left and right upper plates 23 interconnecting respectively the left and right supporters 21 and two opposite sides of the bottom end of the central plate 22, and laterally extending left and right lower plates 24 interconnecting respectively the left and right supporters 21 and two opposite sides of the top end of the central plate 22. The central plate 22 includes front and rear faces 221, 222, a pair of upper pivot lug portions 223 disposed adjacent to the top end of the central plate 22, a pair of lower pivot lug portions 224 disposed adjacent to the bottom end of the central plate 22, a vertically extending recess 225 formed in the front face 221 and extending from the top end to the bottom end of the central plate 22, and an opening 226 formed in an upper end of the recess 225. The recess 225 has a lower end formed with an enlarged segment 227 disposed between the left and right lower plates 24. A pair of spaced apart guide rollers 228 project from the central plate 22 within the enlarged segment 227 of the recess 225. A cover 28 is mounted on the central plate 22 for covering the enlarged segment 227 of the recess 225. A pair of apertures 229 are formed in the central plate 22 at two opposite sides of the enlarged segment 227 of the recess 225. The backrest 2 is turnable upwardly and rearwardly relative to the stroller frame 1 away from the seat rods 16, and downwardly and forwardly relative to the stroller frame 1 toward the seat rods 16.

The left and right upper plates 23 are mounted pivotally and respectively on the upper pivot lug portions 223 and the left and right supporters 21 via pivot pins 26. The left and right lower plates 24 are mounted pivotally and respectively on the lower pivot lug portions 224 and the left arid right supporters 21 via pivot pins 27. Each of the left and right lower plates 24 has one end 241 formed, with a protrusion guide 243, and a string passing channel 242 formed therein and extending from the one end 241 toward the respective one of the apertures 229 in the central plate 22.

The left and right positioning members 3 include respectively left and right swingable pieces 35, and left and right locking protrusions 20. The left and right swingable pieces 35 have respectively pivot ends 31 mounted pivotally and respectively on the rear legs 14, free ends 32 opposite to the pivot ends 31, left and right bottom edges 34 formed with a plurality of spaced apart and aligned locking grooves 342 which open downwardly, and left and right guide rails 341 disposed respectively underneath and aligned vertically and respectively with the left and right bottom edges 34. The left and right locking protrusions 20 project respectively from the left and right supporters 21 of the backrest 2 to engage selectively and releasably one of the grooves 342 in the left and right bottom edges 34 for positioning the backrest 2 to a desired inclined position. The left and right swingable pieces 35 are turnable relative to the stroller frame 1 so as to move upwardly and rearwardly to an unlocking position for disengaging respectively the locking grooves 342 in the left and right bottom edges 34 from the left and right locking protrusions 20, and to move downwardly and forwardly to a locking position for engaging respectively the locking grooves 342 in the left and right bottom edges 34 and the left and right locking protrusions 20.

The releasing unit 4 includes a pulling member, left and right pushing members 45 mounted movably and respectively on the left and right supporters 21 of the backrest 2 for moving the left and right swingable pieces 35 of the left and right positioning members 3 to the unlocking position, and left and right urging members 46 that urge respectively the left and right pushing members 45 to move away from the left and right swingable pieces 35.

The pulling member includes a vertically extending metal rod member 41 that is received in the recess 225, and that has an upper end with a handle 42 which is received slidably in the opening 226 in the recess 225 and a lower end opposite to the upper end of the rod member 41, a plastic connecting block 43 that is connected to the lower end of the rod member 41 and that has a through-hole 431, and a single flexible string 44 passing through the through-hole 431 in the connecting block 43. The string 44 extends sidewisely from the through-hole 431 into the string passing channels 242 in the left and right lower plates 24, passes over the protrusion guides 243 of the left and right lower plates 24, and turns downwardly to be connected to the left and right pushing members 45. The through-hole 431 in the connecting block 43 is disposed between the guide rollers 228 such that when the string 44 is pulled upwardly, the string 44 will be guided by the guide rollers 228.

Each of the left and right pushing members 45 of the pulling member 4 has a sleeve 451 sleeved slidably around the respective one of the left and right supporters 21 of the backrest 2, a pushing arm 454 projecting outwardly from the sleeve 451 to a bottom side of the respective one of the left and right supporters 21 for pushing the respective one of the left and right swingable pieces 35 to the unlocking position, and a retaining protrusion 452 projecting outwardly from the sleeve 451 and having a retaining slot 453 for retaining an end portion 441 of the string 44.

Figure 5:
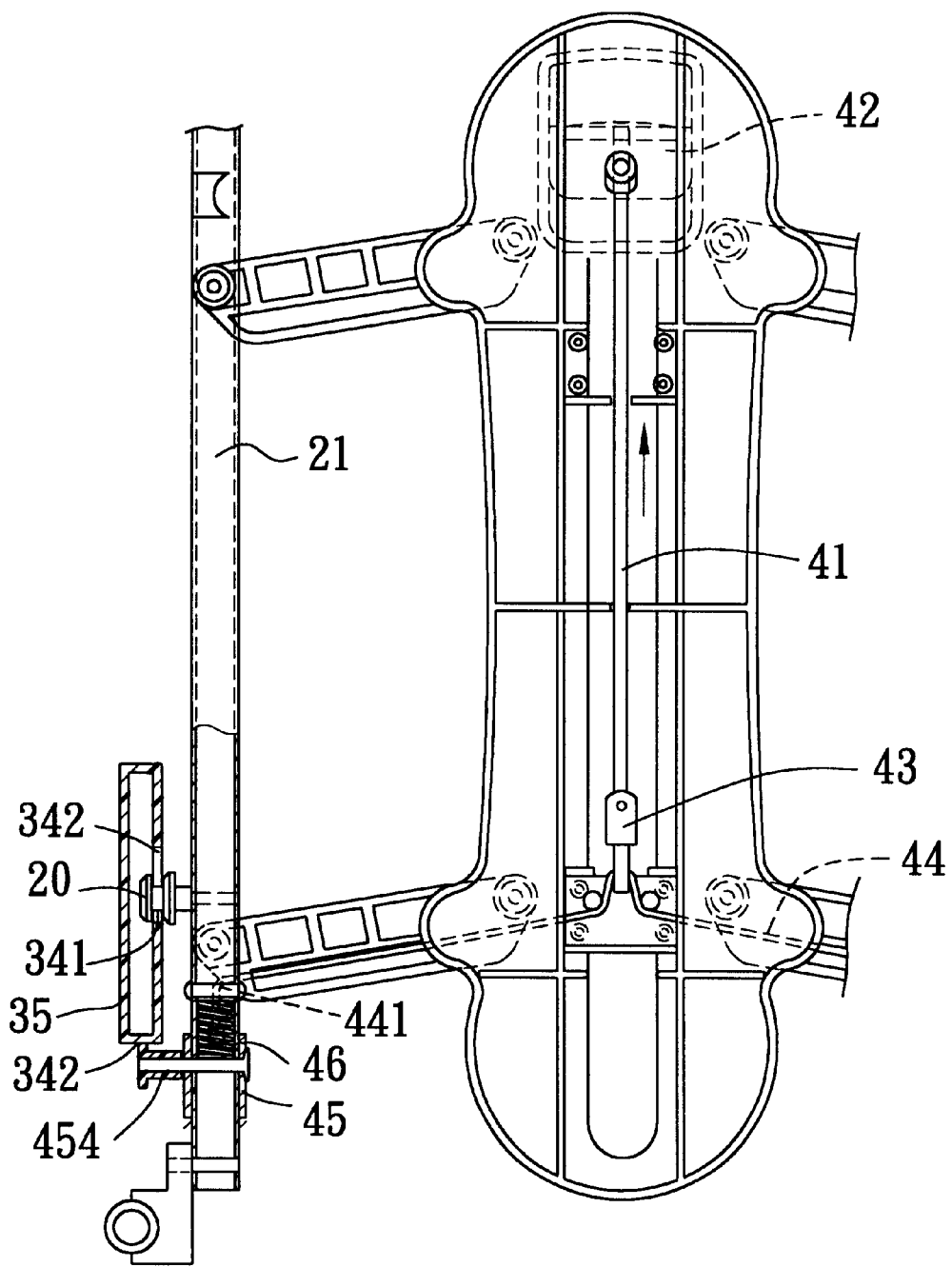
FIG. 5 is a fragmentary front view of a backrest of the stroller of FIG. 1 in an unlocking position.

Referring now to FIG. 5, in combination with FIGS. 1 to 4, to adjust the backrest 2 to a desired inclined position, the left and right swingable pieces 35 are moved to the unlocking position by pulling the handle 42 upwardly, and are subsequently slid along the guide rails 341 to a position in which the left and right locking protrusions 20 are aligned vertically and respectively with the desired locking grooves 342 in the left and right bottom edges 34 of the left and right swingable pieces 35. The left and right swingable pieces 35 are then turned downwardly to the locking position by virtue of gravity upon releasing of the handle 42.

With the arrangement of the rod member 41, the connecting block 43, and the single flexible string 44 as described above, the problems associated with the prior art can be eliminated.

With the invention thus explained, it is apparent that various modifications and variations can be made without departing from the spirit of the present invention. It is therefore intended that the invention be limited only as recited in the appended claims.

I claim:

1. A stroller, comprising:

a stroller frame having front and rear legs and a seat frame secured to said front and rear legs;

a backrest having left and right supporters mounted pivotally and respectively on two opposite sides of said seat frame adjacent to said rear legs for turning upwardly and rearwardly relative to said stroller frame away from said seat frame, and downwardly and forwardly relative to said stroller frame toward said seat frame;

left and right positioning members respectively having left and right swingable pieces, and left and right locking protrusions, said left and right swingable pieces being mounted pivotally and respectively on two opposite sides of said stroller frame adjacent to said left and right supporters of said backrest, resepctively, and having respectively left and right bottom edges formed with a plurality of spaced apart and aligned locking grooves which open downwardly, said left and right locking protrusions projecting respectively from said left and right supporters to engage selectively and releasably one of said locking grooves in said left and right bottom edges for positioning said backrest, said left and right swingable pieces being rotatable relative to said stroller frame so as to move upwardly and rearwardly to an unlocking position for disengaging said locking grooves in said left and right bottom edges from said left and right locking protrusions, and to move downwardly and forwardly to a locking position for engaging said locking grooves in said left and right bottom edges and said left and right locking protrusions; and a releasing unit including a pulling member mounted movably on said backrest between said left and right supporters for moving upwardly and downwardly relative to said backrest, left and right pushing members mounted movably and respectively on said left and right supporters for moving said left and right swingable pieces of said left and right positioning members to said unlocking position, and left and right urging members that urge respectively said left and right pushing members to move away from said left and right swingable pieces, said pulling member including a vertically extending rigid rod member mounted movably on said backrest between said left and right supporters, a connecting block that is connected to a lower end of said rod member and that has a through-hole, and a single flexible string passing through said through-hole in said connecting block and extending sidewisely from said through-hole to be connected to said left and right pushing members.

2. The stroller of claim 1, wherein said backrest further has a vertically extending central plate having top and bottom ends, laterally extending left and right lower plates interconnecting respectively two opposite sides of said bottom end of said central plate and said left and right supporters, and a vertically extending recess extending from said bottom end to said top end of said central plate for receiving said rod member therein.

3. The stroller of claim 2, wherein said central plate has an opening formed in an upper end of said recess, said rod member having an upper end with a handle which is opposite to said lower end of said rod member and which is received slidably in said opening.

4. The stroller of claim 3, wherein said pulling member further includes a pair of guide rollers disposed on two opposite sides of said lower end of said rod member to guide said string when said rod member moves upwardly.

5. The stroller of claim 4, wherein each of said left and right lower plates has one end formed with a protrusion guide adjacent to the respective one of said left and right pushing members, said string passing over said protrusion guide and then turning downwardly to be connected to said left and right pushing members.

\* \* \* \* \*